United States Patent [19]

Michlin

[11] Patent Number: 5,261,326

[45] Date of Patent: Nov. 16, 1993

[54] METHOD TO MODIFY A PRINTER CARTRIDGE TO FUNCTION IN A FAX MACHINE

[76] Inventor: Steven B. Michlin, 5310 Bentley #105, West Bloomfield, Mich. 48322

[21] Appl. No.: 42,777

[22] Filed: Apr. 6, 1993

[51] Int. Cl.$^5$ .............................................. B41F 31/00
[52] U.S. Cl. ................................... 101/483; 101/479; 101/335; 29/400.1; 29/428; 355/260
[58] Field of Search .................. 101/483, 335, 479; 29/426.4, 426.5, 428, 469.5, 400.1; 355/260, 245; 222/DIG. 1

[56] References Cited

U.S. PATENT DOCUMENTS

| | | | |
|---|---|---|---|
| 4,816,877 | 3/1989 | Keen | 355/260 |
| 4,924,267 | 5/1990 | Koshikawa | 355/245 |
| 4,963,939 | 10/1990 | Kurando et al. | 355/260 |
| 4,969,557 | 11/1990 | Oka | 206/527 |
| 4,978,995 | 12/1990 | Takahashi | 355/260 |
| 5,055,881 | 10/1991 | Fukuchi | 355/260 |
| 5,182,595 | 1/1993 | Fukuchi et al. | 355/200 |
| 5,184,181 | 2/1993 | Kurando et al. | 355/260 |
| 5,220,379 | 6/1993 | Fukuchi et al. | 355/260 |

Primary Examiner—Eugene H. Eickholt

[57] ABSTRACT

A method for modifying a conventional laser printer toner cartridge assembly so it may be used in a fax machine in place of more expensive cartridges specifically designed for the fax machine. The method comprises removing the cylinderical fitting stubs protruding from the toner hopper portion of the cartridge assembly by grinding or melting them off. Holes are melted in the indentations of the cartridge assembly at the location where the fax machine sensor operates. Clear, flat, thin plastic windows are attached over these holes to allow the light beam from the sensor to enter the toner hopper. An additional indentation is formed on the toner hopper portion of the cartridge assembly corresponding in location to fitting and aligning protrusions on the fax machine. This indentation is melted or pressed into the cartridge assembly casing and is made less sloppy and rough in appearance by applying a filler material over portions of the indentation. Since the holes and indentation are made by a heating process, the toner within the toner hopper portion of the cartridge assembly will not be contaminated, and since the windows are thin and flat the toner distribution paddle within the cartridge assembly does not have to be notched. So the cartridge assembly does not have to be disassembled or emptied of toner prior to modification.

20 Claims, 4 Drawing Sheets

METHOD TO MODIFY A PRINTER CARTRIDGE TO FUNCTION IN A FAX MACHINE

BACKGROUND OF THE INVENTION

There are two very similar toner cartridges. One is the "LX" cartridge used in some Hewlett Packard laser printers. The other is used in the Canon L-700 series fax machines. The cartridges are almost identical. However, there are a few small differences that prevent the "LX" cartridge from functioning properly in the Fax machine. The Fax cartridge, on the other hand, may function on its own universally in either the fax machine and in the laser printer. The reason it was worth the great effort to develop a modification of the "LX" cartridge to be similarly universal is very simple. Cost. The "LX" laser printer cartridge may be purchased at discount houses, office supply houses, etc., and is readily available at many different companies. The universal fax cartridge, however, is only available at the manufacturer's dealers. As a result, it is apparent from personal observation that the retail cost of the fax cartridge is usually much more expensive. In some cases it is double the cost of the "LX" printer cartridge. This has created a vacuum in the marketplace. However, rather than focus on the market, the focus of this invention will be on a method of modifying the "LX" cartridge for universal use.

One solution to the above problem created by the described market vacuum is that many companies now remanufacture the fax cartridges so they may be re-used. This has helped many endusers to re-use the fax cartridges over and over. However, when the empty cartridge is no longer usable, which inevitably occurs at some point in the cartridge's life, the enduser has no choice but to purchase a brand new cartridge at double the price of the "LX" cartridge. Consequently, a need has developed for a method of modifying a "LX" printer cartridge, either empty or brand new, to be similarly universally usable in both the laser printer and the fax machine. That is the invention that will be further described in this patent application. However, this invention has gone further by doing the cartridge modification without having to disassemble the cartridge and without having to empty the toner. For the enduser who must replenish with a brand new cartridge, with this invention the cartridge may be modified while yet unused.

SUMMARY OF THE INVENTION

In this invention, a toner cartridge of the HP LX laser printer type is modified so it may be used in Canon L-700 or other series fax machines. The modified cartridge would then be an alternative to buying a much more expensive cartridge specifically designed for the fax machines.

Accordingly, it is an object of this invention to provide a cheaper cartridge assembly for certain types of fax machines.

Another object of this invention is to provide the cheaper cartridge assembly by modifying a conventional laser printer cartridge.

It is a further object of this invention to make this modification without having to disassemble or take apart the cartridge assembly, without having to remove the toner, and without having to notch the toner distribution paddle.

The invention is accomplished by removing the cylinderical fitting stubs on the conventional printer cartridge assembly. Holes are formed in the indentations on the assembly which align with the light sensor mounted in the fax machine, and clear, flat, thin windows are attached covering these holes. An additional indentation is heat formed in the cartridge assembly casing to correspond with aligning devices in the fax machine. The modification method is designed so it does not contaminate the toner in the toner hopper portion of the cartridge assembly, and so the windows do not protrude into the hopper and cause the need to notch the toner distribution paddle.

BRIEF DESCRIPTION OF THE DRAWINGS

This invention, together with other objects, features, aspects, and advantages thereof, will be more clearly understood from the following description, considered in conjunction with the accompanying drawings.

COMPLETE DESCRIPTION OF THE PREFERRED EMBODIMENT

Figure 1:
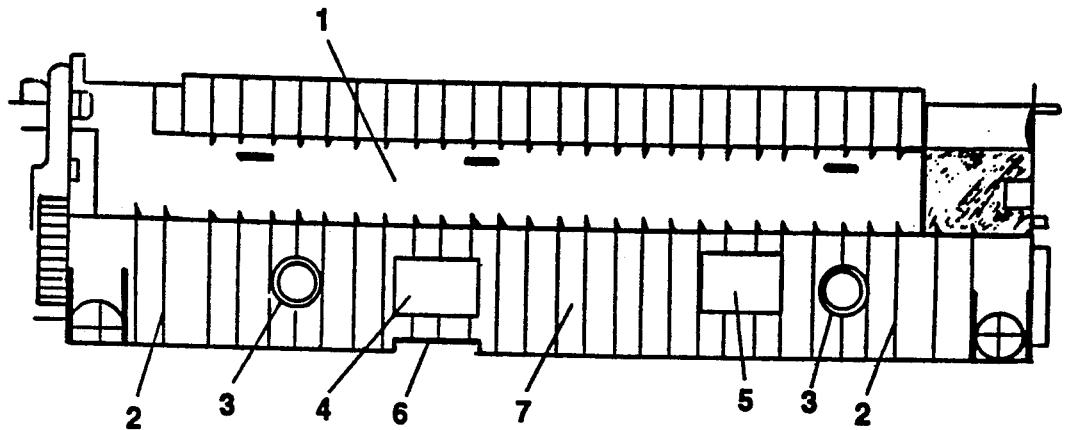
FIG. 1 shows part of a conventional toner cartridge assembly. It is a rear view, opposite the view a user would see as the user inserts the cartridge assembly in the printer or fax machine.
Figure 2:
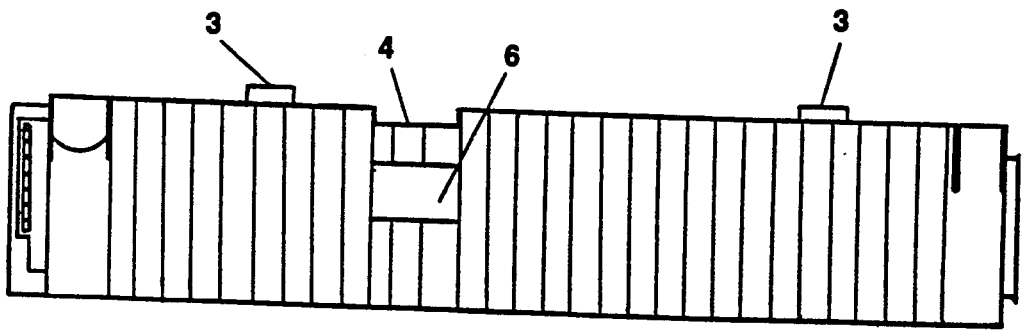
FIG. 2 is an underside view of the cartridge assembly shown in FIG. 1.

FIG. 1 shows a rear view conventional HP laser printer "LX" toner cartridge assembly 1. This is the view one would see if one were holding the cartridge in a position for insertion into the printer and then simply turned it around. The cartridge assembly 1 is traversed by raised ridges 2. There are two cylinderical stubs 3 protruding from the ridged area. These stubs are short and formed as part of the cartridge. There are also indentations providing flat portions in the ridged area. These indentations are referenced as 4, 5, and 6. The third indentation 6 is shown better in FIG. 2, the underside view of the cartridge assembly 1. These stubs and indentations are located on the toner hopper portion 7 of the cartridge assembly. The hopper holds the toner prior to its use in the printing process.

Figure 3:
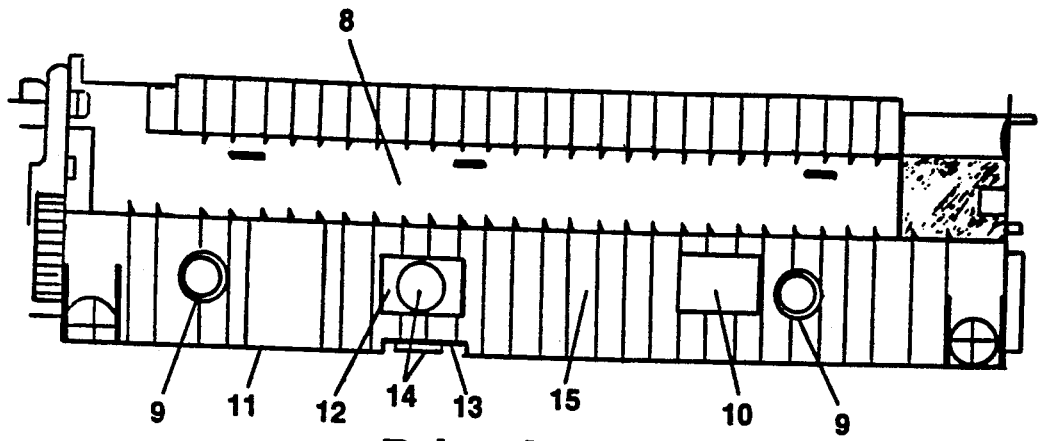
FIG. 3 is a rear view of a conventional toner cartridge assembly specifically designed for use with a Canon L-700 or other series fax machine.
Figure 4:
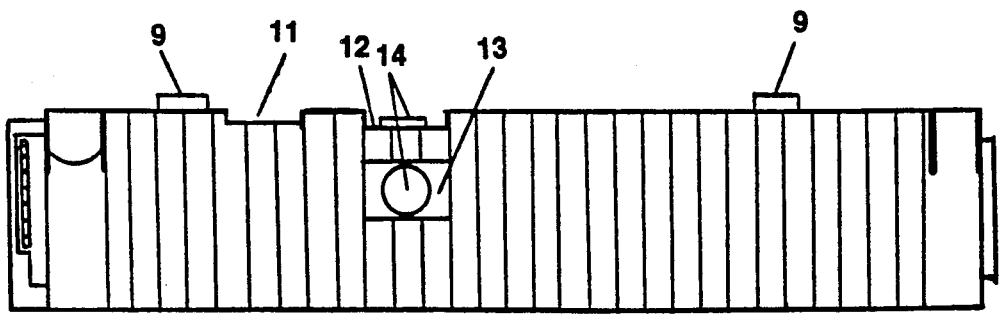
FIG. 4 is an underside view of the cartridge assembly shown in FIG. 3.

The cartridge assembly 8 for the Canon fax machine is shown in FIGS. 3 and 4. It is approximately the same size as the LX cartridge assembly 1. The cartridge assembly 8 also has two cylinderical stubs 9. However, these are located further towards the left (as viewed in the drawings) of the cartridge. There is an indentation 10 which corresponds to the indentation 5 in the LX cartridge. There is a left indentation 11 on the cartridge assembly 8 for the Canon fax machine which is not present on the LX cartridge assembly 1. Two further indentations 12 and 13 correspond in location to the indentations 4 and 6 on the LX cartridge. However, the indentations 12 and 13 include cap plug windows 14 for allowing a light-sensor and light-source mounted on the fax machine to indicate if light passes through. The different locations of the cylinderical stubs 3 on the LX cartridge assembly 1 prevents the cartridge from fitting into the Canon fax machine. The lack of a left indentation on the LX cartridge assembly 1, corresponding to the left indentation 11 on the cartridge assembly 8 designed for the fax machine, and the lack of cap plug windows in the LX cartridge assembly indentations 4 and 6 prevent the cartridge assembly 1 from functioning properly in the fax machine.

Figure 5:
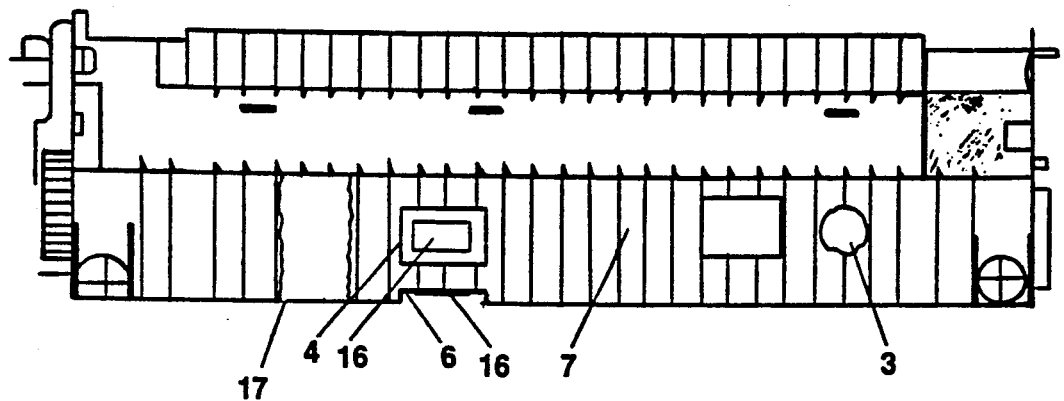
FIG. 5 is a rear view of the toner cartridge assembly of FIG. 1 modified for use with a Canon L-700 or other series fax machine.
Figure 6:
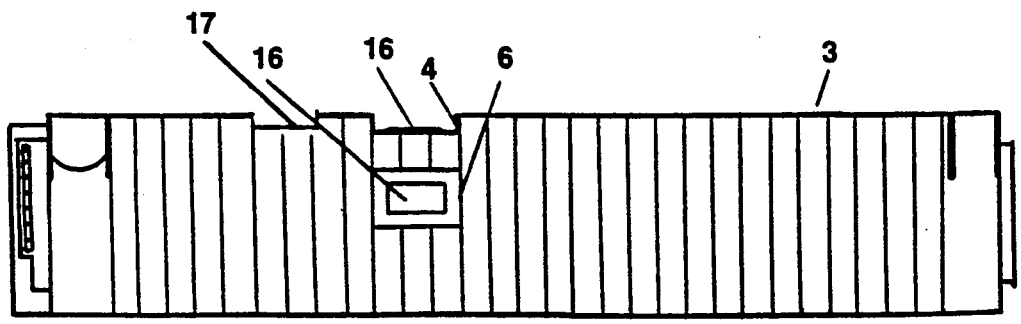
FIG. 6 is an underside view of the cartridge assembly shown in FIG. 5.

Therefore, the cylinderical stubs 3 are removed from the LX cartridge assembly 1. The stubs 3 may be ground down by a grinder. Alternately, the stubs may be removed by heat, such as through the use of a soldering iron to melt the stubs off. The modified LX cartridge assembly is shown in FIGS. 5 and 6. The stubs 3 have been removed. The LX cartridge assembly will now fit into the Canon fax machine, but it will still not function properly. In some cases it will print a blank sheet.

So the LX cartridge is further modified by putting two flat, clear windows 16 (not cap plugs as in the fax cartridge 8) in the indentations 4 and 6. The windows 16 allow the light beam from the sensor in the fax machine to pass through the assembly. Note that although the windows are rectangular in FIGS. 5 and 6, round holes under the windows will work just as well.

But the fax machine will still not function properly. An additional indentation needs to be made on the LX cartridge assembly 1 corresponding in location to the indentation 11 on the cartridge assembly 8 designed for the Canon fax machine. The indentation must line up with the previously ground stub 3. The indentation 17 is made by heating the cartridge with a heat source such as a torch in the area of the desired indentation. When the plastic toner hopper 7 is hot and soft at this location, a smooth, solid piece of material is pressed hard against the heated area to work the indentation in. It has been found that a rectangular-shaped piece of wood, approximately one inch wide (¾ inch to 1¼ inch) with a plastic skin such as polycarbonate glued on, works well as the smooth, solid piece of material used to form the indentation 17. The indentation 17 may not be deep enough after the first try. The heat and pressure process on the cartridge may be repeated until the depth and other dimensions of the indentation 17 are appropriate. Usually it takes one to five tries. It should be pointed out that the level of difficulty is increased because this process forms a groove in the shape of this already molded toner hopper 7. However, it is further increased in difficulty because the groove 17 is located where the nub 3 was ground down. The difficulty can easily be noticed when heating the area with a torch, prior to applying pressure. Another way to develop this indentation 17 is to heat the cartridge assembly 1 with a heating element along the desired indentation area. The heating element could be, for example, a heat-knife, a soldering iron or other heat-iron. Soldering irons are often made of copper and are not actually flat but cylinderical. This cylinderical device works fine since the indentation 17 is for the purpose of allowing the cartridge to fit straight in the fax machine where a protrusion that sticks in an upward direction would throw off the straightness of the cartridge in the fax machine. When not perfectly straight, or nearly perfectly straight the fax machine will not function properly. So this indentation 17 must be in the cartridge. Alternately, the protrusion in the fax machine may be ground down, but the most practical version of this product involves modifying the cartridge to fit in the fax machine. Then the cartridge is universal.

However, where the indentation 17 is put on the hopper by heat, the indentation is not perfect. It may look unprofessional, rough and sloppy. This is partly because the area heat-formed was not of even thickness because the nub 3 was ground down there. Many customers, particularly those of the type that use the fax machine, will not want a "sloppy" looking cartridge with an imperfect indentation. This may easily be fixed by putting a plastic, glue or filler material over the sloppy parts. Alternately, a thin piece of plastic such as polycarbonate may be put over the indentation 17 with filler to improve its appearance. Other plastics will work well too. For example "bondo" as used in the auto body business may be used. However, this brittle material may peel off, break, or chip from the slightest impact. So, a silicone glue material is more durable and, therefore, desirable. Other filler/glue materials may be used. Those that are most desirable are those that are not brittle and are stretchy and will not pop off from the impact of placing a cartridge in the fax machine. Furthermore, it must be capable of withstanding the impact if a cartridge falls on the ground, even though such impact would damage other components of the cartridge assembly as well. By having the capability of not popping off upon impact, the improved indentation appearance will have extra engineering strength.

Figure 7:
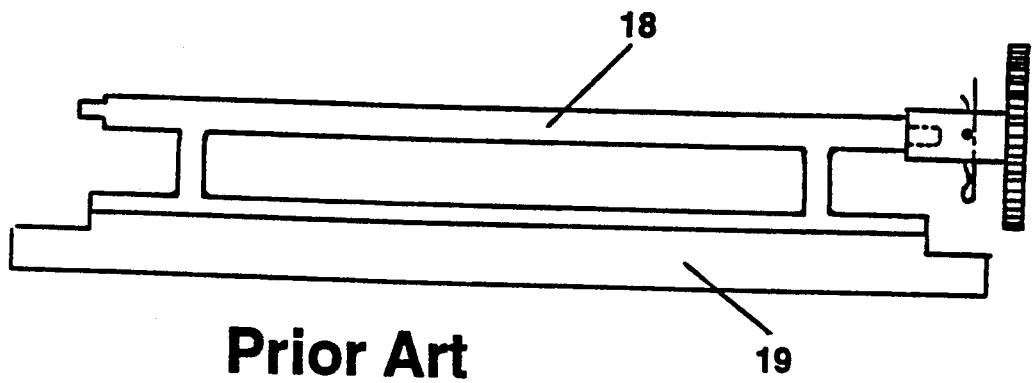
FIG. 7 shows the toner distribution paddle located within the conventional toner cartridge assembly of FIG. 1.
Figure 8:
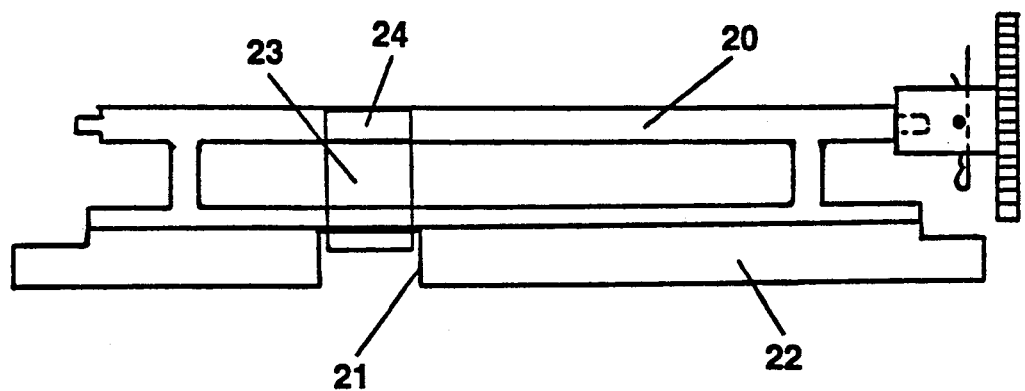
FIG. 8 shows the toner distribution paddle located within the cartridge assembly specifically designed for use with a Canon L-700 or other series fax machine (as shown in FIG. 3).

Inside both cartridge assemblies 1 and 8 is a toner distribution paddle. The rotating paddle within the assembly moves the toner in the toner hopper evenly and efficiently to a roller for distribution in the printing process. A very important consideration in this invention is that the toner distribution paddle inside the toner hopper 15 of the fax cartridge assembly 8 differs from the paddle in the LX printer cartridge assembly 1. The difference is the result of the clear windows 14 in the fax cartridge assembly 8. The clear windows in the fax cartridge assembly are made using a cap plug, a cylinderical plastic plug, closed at one end with a reinforcing lip protrusion around the other end. The point is that the cap plug protrudes into the toner hopper and interferes with the rotating toner distribution paddle. FIG. 7 shows the conventional toner distribution paddle 18 used in the LX cartridge assembly 1. The paddle 18 has a flexible blade 19 for moving the toner. FIG. 8 shows a toner distribution paddle 20 used in the cartridge assembly 8 designed for the Canon fax machine. The fax cartridge assembly 8 solved the problem of the window cap plug protruding into the toner hopper by providing a notch 21 in the blade 22 in a location corresponding to the plug protrusion. As a result, the blade 22 does not contact the plug protrusion. The protrusion does not interfere with the movement of the blade. The notch is one half inch to one inch in width. A flexible, clear rectangular piece of plastic 23 is attached to the paddle at location 24 opposite the notch in the paddle. This only partially makes up for the interruption in the blade caused by the notch 21, since efficient, even toner movement would not take place at the notch area of the blade. This awkward modification of the paddle has been found unnecessary in this invention. By using a different type of window, the paddle in the modified LX cartridge assembly does not have to be notched. Instead of using a cap plug, holes may be drilled, cut, or melted in the indentations 4 and 6. Then a flat, clear plastic window may be glued or fused over each hole. Polycarbonate, PETG, or any other clear plastic may be used for the windows 16. It has been found that polycarbonate plastic with a twenty thousandths of an inch thickness works best because it is relatively inexpensive and has good durability, impact resistance, relatively good scratch-resistance and may be obtained clear in color so the light beam from the sensor mounted in the fax machine may easily pass through. By putting on a small plastic cover instead of a cap plug, the toner distribution paddle requires no modification or replacement.

This is very important because as a result of the disclosed method of modification of the LX cartridge assembly 1 for use in a fax machine, the modification can take place without disassembling the cartridge assembly. Brand new toner cartridges may be modified as well without requiring cartridge disassembly or toner removal. As described, the indentation 17 is added by heating and pressing down the desired area. This won't affect or contaminate the toner in any way because when the indentation process is performed, the heated portion of the assembly is facing up and is not in contact with toner. The holes for the windows 16 may be made in the toner hopper 7 by using a hot device such as a soldering iron, so no plastic dust will be generated that could contaminate the toner powder. So the powder doesn't have to be removed prior to the modification. Since the windows 16 are flat, the cartridge assembly 1 does not have to be taken apart and provided with a notched toner distribution paddle. The method of this invention eliminates the need for buying the more expensive toner cartridge assembly designed specifically for the fax machine.

What is claimed is:

1. A method for modifying a laser printer cartridge assembly, without disassembling it, so said cartridge assembly may be used in a fax machine, said method comprising removing the cylinderical stubs protruding from the toner hopper portion of the cartridge assembly, making holes in the indentations of the cartridge assembly at the location of the fax machine light-sensor, covering said holes with clear windows, and providing an additional indentation on said toner hopper portion of said cartridge assembly corresponding in location to fitting and aligning means on said fax machine.

2. A method as in claim 1 wherein said cylinderical stubs are ground down by a grinder to remove said cylinderical stubs from said toner hopper portion of said cartridge assembly.

3. A method as in claim 1 wherein said cylinderical stubs are removed by a heating process.

4. A method as in claim 3 wherein said heating process comprises melting said cylinderical stubs off said toner hopper portion of said cartridge assembly with a soldering iron.

5. A method as in claim 1 wherein said holes are melted into the indentations of the cartridge assembly to avoid contaminating toner in said toner hopper portion.

6. A method as in claim 1 wherein said clear windows are flat so they do not protrude into the toner hopper portion of said cartridge assembly, whereby disassembling said cartridge assembly and notching the inner toner distribution paddle is avoided.

7. A method as in claim 6 wherein said clear windows are thin pieces of plastic.

8. A method as in claim 7 wherein said plastic is polycarbonate.

9. A method as in claim 1 wherein said additional indentation is provided by first heating the cartridge assembly in the area of the desired indentation with a torch, then pressing against the heated area with a solid piece of material to work the indentation in.

10. A method as in claim 9 wherein said solid piece of material is a rectangular-shaped piece of wood.

11. A method as in claim 10 wherein said rectangular-shaped piece of wood has a polycarbonate skin to provide said solid piece of material with a smooth surface.

12. A method as in claim 1 wherein said additional indentation is provided by heating the cartridge assembly with a heating element along the desired indentation area.

13. A method as in claim 12 wherein said heating element is a heat-knife.

14. A method as in claim 12 wherein said heating element is a soldering iron.

15. A method as in claim 9 wherein a filler material is used to make said additional indentation less sloppy and rough in appearance.

16. A method as in claim 15 wherein said filler material is bondo.

17. A method as in claim 15 wherein said filler material is a silicone glue substance.

18. A method as in claim 12 wherein a filler material is used to make said additional indentation less sloppy and rough in appearance.

19. A method as in claim 18 wherein said filler material is bondo.

20. A method as in claim 18 wherein said filler material is a silicone glue substance.

* * * * *